(12) United States Patent
Raphaeli (10) Patent No.: US 6,937,648 B2
(45) Date of Patent: Aug. 30, 2005

(54) EQUALIZER FOR COMMUNICATION OVER NOISY CHANNELS

(75) Inventor: Dan Raphaeli, Kfar Saba (IL)

(73) Assignee: Yitran Communications LTD, Beersheva (IL)

( * ) Notice: Subject to any disclaimer, the term of this patent is extended or adjusted under 35 U.S.C. 154(b) by 650 days.

(21) Appl. No.: 09/825,268

(22) Filed: Apr. 3, 2001

(65) Prior Publication Data

US 2004/0240595 A1 Dec. 2, 2004

(51) Int. Cl.$^7$ .............................. H03H 7/30; H03H 7/40; H03K 5/159
(52) U.S. Cl. ........................ 375/229; 375/343; 375/232; 375/233
(58) Field of Search ........................ 375/343, 229–236; 348/614

(56) References Cited

U.S. PATENT DOCUMENTS

| | | | |
|---|---|---|---|
| 3,875,515 A | * | 4/1975 | Stuart et al. ................. 375/232 |
| 4,628,530 A | | 12/1986 | Op De Beek et al. |
| 5,179,572 A | | 1/1993 | Schilling |
| 5,237,587 A | | 8/1993 | Schoolcraft |
| 5,524,023 A | | 6/1996 | Tsujimoto |
| 5,574,748 A | | 11/1996 | Vander Mey et al. |
| 5,946,351 A | | 8/1999 | Ariya Visitakul et al. |
| 6,559,894 B2 | * | 5/2003 | Omura et al. ................ 348/614 |
| 2001/0004390 A1 | | 6/2001 | Pukkila et al. ............... 375/340 |

OTHER PUBLICATIONS

Wolfgang H. Gerstacker, Member IEEE, Ralf R. Muller, Member, IEEE and Johannes B. Huber, Member IEEE, "Interactive Equalization with Adaptive Soft Feedback" Not dated.

* cited by examiner

*Primary Examiner*—Stephen Chin
*Assistant Examiner*—Curtis Odom
(74) *Attorney, Agent, or Firm*—Zaretsky & Associates PC; Howard Zaretsky (57) ABSTRACT

An apparatus for and a method of iterative equalization for communication over noisy channels suitable for use with a wide range of different types of communications systems and channels that is particularly applicable to power line based communication systems. Equalization of received symbols is achieved by iteratively removing the influence of previous symbols dispersed due to channel ISI. Equalization is performed using iterative subtraction in combination with calculations based on the inverse of the transfer matrix. The impulse response of previous symbols is subtracted out to yield the impulse response of the received symbol. The estimate of the current symbol $\tilde{B}_n$ is then calculated by passing the modified received symbol through a matched filer which functions to remove the effect of channel ISI from the symbol. Multiple iterations are performed to improve the accuracy of the resultant symbol decision.

77 Claims, 6 Drawing Sheets

EQUALIZER FOR COMMUNICATION OVER NOISY CHANNELS

FIELD OF THE INVENTION

The present invention relates generally to data communication systems and more particularly relates to an apparatus for and a method of iterative equalization for communication over noisy channels.

BACKGROUND OF THE INVENTION

In recent years, the world has witnessed explosive growth in the demand for all types of communications and it is predicted that this demand will increase in the future. In order to communicate information accurately and efficiently, communications receivers are designed to extract information from the channel as best they can. Receivers are designed to operate optimally with certain types of channels, e.g., power line, IR, RF, optical, twisted pair, coax, etc. Various types of noise, however, are a characteristic feature of most channels. Well-known types of channel noise include Intersymbol Interference (ISI) caused by pulse spreading in the channel, fading, intermodulation distortion, multipath, etc. Performance is severely affected in receivers not designed to adequately handle such types of channel noise.

Equalization is a well-known signal processing technique used to combat the Intersymbol Interference distortion imparted to the transmitted signal by the channel whereby the receiver attempts to compensate for the effects of the channel on the transmitted symbols. An equalizer attempts to determine the transmitted data from the received distorted symbols using an estimate of the channel that caused the distortions. Examples of commonly used types of equalizers include the maximum likelihood sequence estimation (MLSE) equalizer that utilizes the well known Viterbi Algorithm (VA), linear equalizer and decision feedback equalizer (DEE). In communications systems where ISI arises due to partial response modulation or a frequency selective channel, a maximum likelihood sequence estimation (MLSE) equalizer is optimal.

Many modern equalization techniques, however, utilize very complex signal processing algorithms to achieve acceptable levels of performance. Practically, most of these techniques can only be performed on expensive high powered digital signal processors. With the ever pressing demand to make communications enabled products smaller, cheaper and high performing, it would be desirable to implement the entire communications hardware in silicon, such as in an Application Specific Integrated Circuit (ASIC) or the like. To place the complex, sophisticated equalization techniques of the prior art on an ASIC, however, would be nearly impossible in terms of gate count and cost, given today's available gate densities and chip sizes. Prior art equalization techniques require extremely large processing resources and memory in order to implement them in silicon.

Thus, there is a need for an equalization technique that is capable of achieving adequate levels of performance while lending itself for efficient and inexpensive implementation in silicon, e.g., ASICs, etc.

SUMMARY OF THE INVENTION

The present invention is an apparatus for and a method of iterative equalization for communication over noisy channels. The present invention is suitable for use with a wide range of different types of communications systems and channels and is particularly applicable to power line based communication systems.

Many types of channels, especially the power line media, typically suffer from Intersymbol Interference due to the pulse spreading effects of the channel. The iterative equalization technique of the present invention provides a solution to the communication problems imposed by the characteristics of the power line media, e.g., Intersymbol Interference, etc. In addition, the technique is well suited for implementation in integrated circuit form, e.g., ASIC, etc. thus enabling communications over noisy channels in receivers employing a wide range of communication technologies.

The detection of the received bits is performed by first eliminating the influence of the channel $h_i$ using the iterative equalization technique of the present invention. This technique comprises two equalization steps: the first step performs iterative subtraction while the second step uses the inverse of the transfer matrix. Note that the iterative equalization method of the present invention may be applied to any digital modulation, such as BPSK, QPSK and QAM modulations. Although the invention is described in the context of BPSK symbols, it is appreciated that one skilled in the art can apply it to communication systems wherein each symbol represents a plurality of bits.

In iterative subtraction, the impulse response of the best estimate of previously estimated symbols (which include both past and future symbols) are processed by a soft decision function. The results are then subtracted out to yield the impulse response of a plurality of adjacent received symbols, termed the modified received symbol. This operation 'cleans' the intersymbol interference due to the previously processed symbols with the exception of a few neighboring symbols. Once the modified received symbol is calculated, the estimate of the current symbol $\tilde{B}_n$ can then be calculated by passing the modified received symbol through a matched filter which functions to collect the energy within the symbol.

Note that throughout this document, the following definitions apply. The term 'previous symbol' is defined as a symbol that has already been processed and whose index is lower than the current symbol being processed by the equalizer, i.e. $B_n$ where $n>0$. The index refers throughout to the time when the symbol was sampled by the A/D converter. The term 'future symbol' is defined as a symbol that is received later in time and that has an index higher than that of the current symbol. The term 'previously processed symbol' is defined as a symbol that is still within the equalizer and may comprise a previous or future symbol with regard to its index.

For example, consider the iterative equalizer in iteration j and processing symbol n. In this example, the previous symbols, indexed $n-1 \ldots n-m$, were last processed during iteration j. Future symbols, indexed $n+1 \ldots n+m$ were last processed during iteration j-1. Note that the term 'previously estimated symbol' is identical to the term 'previously processed symbol.'

It is important to note that bad estimates of the previously processed symbols may influence the estimation of the current symbol. In order to overcome this problem, the present invention performs one or more iterations. In the second iteration, the majority of the influence from neighboring symbols is already subtracted out, thus enabling more accurate estimations to be calculated. Third and subsequent iterations are performed to achieve even more accurate results.

In the example embodiment presented herein, the influence of the n–1$^{th}$ previously processed symbol is calculated using the inverse matrix derived using the optimum equalization technique rather than using iterative subtraction. This enhances the accuracy of the resultant soft symbol decision.

There is therefore provided in accordance with the present invention a method of equalization of symbols transmitted over a channel having a channel impulse response $h_i$, the method comprising the steps of calculating the impulse response of previously estimated symbols utilizing the channel impulse response $h_i$ and previously estimated decisions, selecting a window having a size of one or more symbols and removing the influence of previously estimated symbols from the received signal so as to generate a modified received signal, correlating the modified received signal with the channel impulse response to obtain a correlation for each symbol in the window, estimating the results of the correlation so as to yield a new estimate of one or more of the transmitted symbols and repeating the steps of calculating, selecting, removing, correlating, estimating and updating.

There is also provided in accordance with the present invention a method of equalization of symbols transmitted over a channel having a length m and a channel impulse response $h_i$, the method comprising the steps of providing a sample shift register array comprising N rows wherein N represents the number of samples per symbol, calculating a cross correlation coefficient matrix and an inverse matrix determinant based on a channel estimate, generating the impulse response of a first number of previous symbols, subtracting the impulse response of the first number of previous symbols from the contents of the register array, cyclically shifting the contents of the register array through a second number of cycles constituting an iteration and repeating the steps of generating and subtracting so as to generate a modified received symbol wherein the influence of the first number of previously processed symbols is removed, performing a matched filter operation on the contents of the shift register array, generating an estimate of a symbol in accordance with the output of the matched filter, removing the influence of previously estimated symbols using the previously estimated symbols and the cross correlation coefficient matrix so as to yield symbol output $B_n$ and wherein m and N are positive integers.

There is further provided in accordance with the present invention an equalizer for equalizing, over a plurality of iterations, symbols transmitted over a channel having a channel impulse response $h_i$ comprising first means for iteratively removing the influence of previous estimated symbols from a received symbol so as to generate a modified current received symbol and for correlating the modified current received symbol with the channel response to yield a matched filter output, a new modified received symbol and matched filter output generated every iteration of the equalizer, second means for calculating a current symbol decision utilizing a previous symbol decision, the output of the matched filter and a cross correlation coefficient matrix and a quantizer adapted to quantize the current symbol decision to a quantized symbol decision having a finite number of possible values and third means for calculating a correction value comprising the difference between the current symbol decision calculated during the current iteration and the previous symbol decision calculated during the previous iteration.

There is also provided in accordance with the present invention a communications receiver for receiving and decoding an M-ary transmitted signal transmitted over a channel having a channel impulse response $h_i$ comprising a front end circuit for receiving and converting the M-ary transmitted signal to a baseband signal consisting of a plurality of received samples, a demodulator adapted to receive the received samples and to generate input samples therefrom in accordance with the M-ary modulation scheme used to generate the transmitted signal, an iterative equalizer operative to receive the input samples and to generate a sequence of symbol decisions therefrom, the iterative equalizer comprising processing means programmed to: calculate the impulse response of previously estimated symbols utilizing the channel impulse response $h_i$ and previously estimated decisions, select a window having a size of one or more symbols and remove the influence of previously estimated symbols from the received signal so as to generate a modified received signal, correlate the modified received signal with the channel impulse response to obtain a correlation for each symbol in the window, estimate the results of the correlation so as to yield a new estimate of one or more of the transmitted symbols, repeat the steps of calculating, selecting, removing, correlating, estimating and updating, a decoder adapted to receive the estimate and to generate binary received data therefrom and wherein M is a positive integer.

There is also provided in accordance with the present invention a computer readable storage medium having a computer program embodied thereon for causing a suitably programmed system to equalize symbols transmitted over a channel having a channel impulse response $h_i$ by performing the following steps when such program is executed on the system: calculating the impulse response of previously estimated symbols utilizing the channel impulse response $h_i$ and previously estimated decisions, selecting a window having a size of one or more symbols and removing the influence of previous symbols from the received signal so as to generate a modified received signal, correlating the modified received signal with the channel impulse response to obtain a correlation for each symbol in the window, estimating the results of the correlation so as to yield a new estimate of one or more of the transmitted symbols, repeating the steps of calculating, selecting, removing, correlating, estimating and updating and wherein M is a positive integer.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ASIC | Application Specific Integrated Circuit |
| BER | Bit Error Rate |
| BPSK | Binary Phase Shift Keying |
| CPU | Central Processing Unit |
| DFE | Decision Feedback Equalizer |
| DSP | Digital Signal Processing |
| EEROM | Electrically Erasable Read Only Memory |
| FEC | Forward Error Correction |
| FPGA | Field Programmable Gate Array |
| IEEE | Institute of Electrical and Electronic Engineers |
| IR | Infrared |
| ISI | Intersymbol Interference |
| LMS | Least Mean Squares |
| LSE | Least Squared Error |
| MAP | Maximum A Priori |
| MLSE | Maximum Likelihood Sequence Estimation |
| MMSE | Minimum Mean Squared Error |
| PN | Pseudo Random |
| QAM | Quadrature Amplitude Modulation |
| QPSK | Quadrature Phase Shift Keying |
| RAM | Random Access Memory |
| RE | Radio Frequency |
| ROM | Read Only Memory |
| SOVA | Soft Output Viterbi Algorithm |
| VA | Viterbi Algorithm |

The present invention is an apparatus for and a method of iterative equalization for communication over noisy channels. The present invention is suitable for use with a wide range of different types of communications systems and channels and is particularly applicable to power line based communication systems.

Many types of channels, especially the power line media, typically suffer from Intersymbol Interference due to the pulse spreading effects of the channel. The iterative equalization technique of the present invention provides a solution to the communication problems imposed by the characteristics of the power line media, e.g., Intersymbol Interference, etc. In addition, the technique is well suited for implementation in integrated circuit form, e.g., ASIC, etc. thus enabling communications over noisy channels in receivers employing a wide range of communication technologies.

Figure 1:
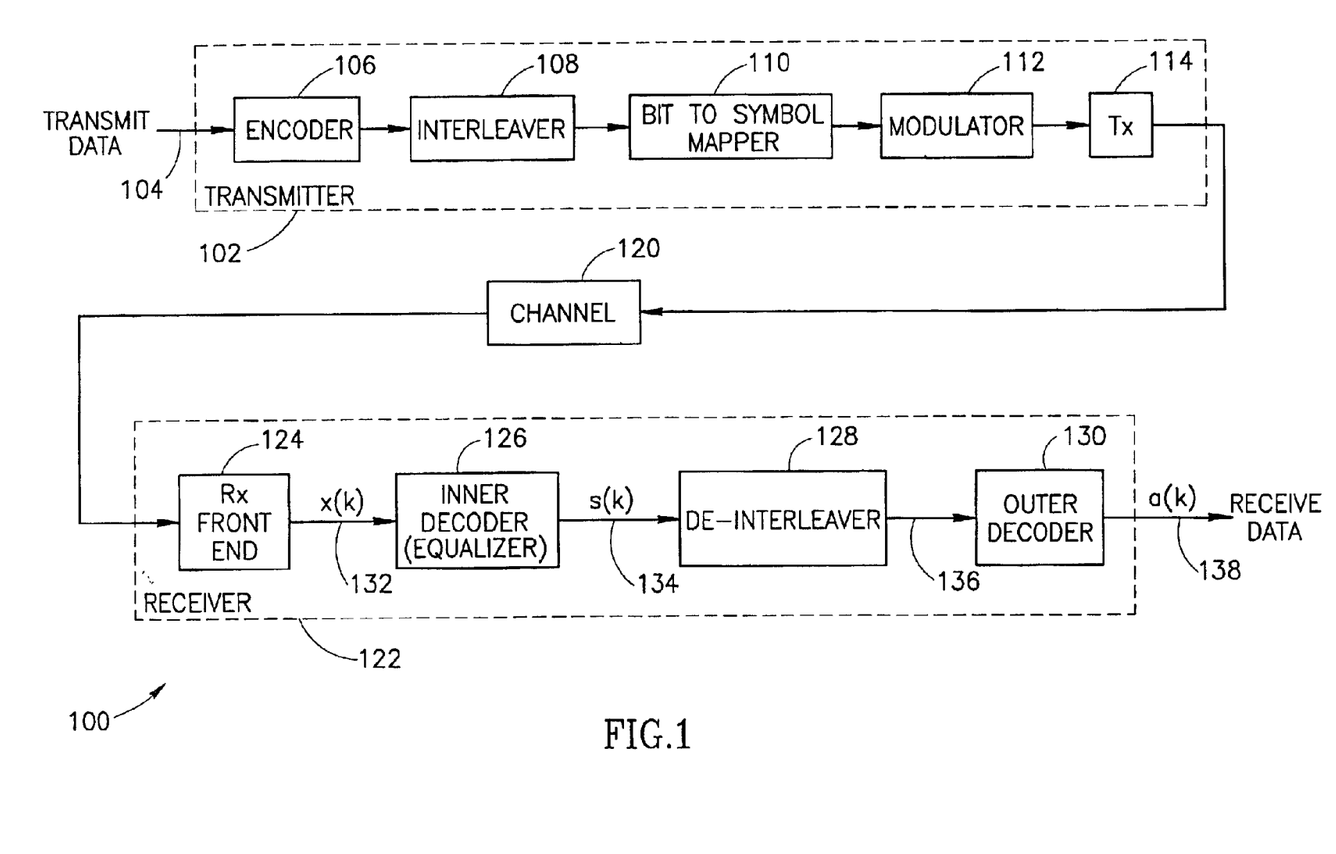
FIG. 1 is a block diagram illustrating an example communications system including transmitter, channel and concatenated receiver.

A block diagram illustrating an example communications system including transmitter, channel and concatenated receiver is shown in FIG. 1. The communications system, generally referenced 100, employs an inner and outer encoder in the transmitter and inner and outer decoding stages in the receiver. The communication system 100 represents the typical scheme that may be used in systems that utilize a wide range of different channel media, e.g., power line, IR, RF, optical, coax, twisted pair, etc. In such a system, the transmitter 102 comprises an encoder 106, interleaver 108, bit to symbol mapper or symbol generator 110, modulator 112 and power amplifier/coupling circuitry 114. Input data bits 104 to be transmitted are input to the encoder 106, which may comprise an error correction encoder such as a Reed Solomon encoder, a convolutional encoder, a parity bit generator, etc. The encoder functions to add redundancy bits to enable errors in transmission to be located and fixed.

In the implementation of the iterative equalizer presented herein, two assumptions are made: (1) the channel parameters are constant for the duration of the entire packet, and (2) the channel response for the transmitted symbol stream is the sum of the channel response for each symbol, or in other words, that the channel is linear. In practice, channel parameters can be tracked during the packet using known adaptive schemes.

It is noted that the channel 120 often times can be modeled as an L-symbol long FIR-type channel, and the encoder and the channel can be viewed as outer and inner encoders. Both the inner and outer encoders in the transmitter have complementary decoders in the receiver.

The bits output of the encoder are then interleaved by interleaver 108. Interleaving rearranges the order of the bits so as to help combat burst errors encountered in the channel or burst errors resulting from the operation of the equalizer. The bits output of the interleaver 108 are then mapped to symbols by the bit to symbol mapper 110. The bit to symbol mapper functions to transform the bits to modulator symbols.

The output from the mapper 110 is input to the modulator 112 which receives symbols in the M-ary alphabet and generates the analog signal that is subsequently transmitted over the channel 120 via the transmit amplifier/coupling circuitry 114. Note that the channel may comprise a wired channel, e.g., power line, twisted pair, xDSL, ISDN, Ethernet, etc. or may comprise a mobile wireless channel, e.g., cellular, cordless, satellite, etc. In each case, the processing performed in the transmitter is intended to generate a signal that can be transmitted over the channel so as to provide robust, error free detection by the receiver.

At the receiver 122, the analog signal from the channel is input to front end circuitry 124 which demodulates and samples the received signal to generate received samples x(k) 132. The symbols are first input to an inner decoder 126. An example of an inner decoder is an equalizer which compensates for the ISI caused by the delay and time spreading of the channel. The function of the equalizer is to detect the symbols that were originally transmitted by the modulator. Examples of commonly used types of equalizers include the maximum likelihood sequence estimation (MLSE) equalizer that utilize the well known Viterbi Algorithm (VA), linear equalizer and decision feedback equalizer (DFE). Examples of soft output type equalizers include Soft Output Viterbi Equalizers (SOVA) and Maximum A Posterior (MAP) algorithm based equalizers.

The output of the inner decoder comprises symbols s(k) 134 that represent either hard or soft decisions. The decisions are then input to a de-interleaver 128. The de-interleaved stream is then input to an outer decoder 130 which functions to locate and fix errors using the redundancy inserted by the encoder. The outer decoder generates the binary receive data a(k) 138.

An example of an outer decoder is a convolutional decoder that utilizes the Viterbi Algorithm. The Viterbi algorithm is widely used in communication systems and has been adapted to perform functions including demodulation, decoding, equalization, etc. Many systems utilize the Viterbi Algorithm in both the inner and outer decoding stages. Other examples include diagonal parity and even odd parity based decoders.

The outer decoder, in some systems, is adapted to utilize the hard decisions output from the inner decoder, e.g., the equalizer. Optimal decoders, on the other hand, require soft decisions instead. For example, an outer decoder that utilizes the Viterbi Algorithm to perform convolutional forward error correction decoding, requires soft decisions as input.

The advantage of a Viterbi decoder is that it can efficiently process soft decision information.

Equalization is a well known technique used to combat intersymbol interference whereby the receiver attempts to compensate for the effects of the channel on the transmitted symbols. An equalizer attempts to determine the transmitted data from the received distorted symbols using an estimate of the channel that caused the distortions. Stated in other words, equalization is a technique used for removing deterioration caused by the channel from received symbols, wherein the deterioration is usually caused by intersymbol interference. The ISI may be caused by reflections, multipath, fading and the effects of a non-flat transfer function for the channel.

Mathematically, the problem can be described as transmitting a series of symbols (or bits) through a channel having an impulse response denoted by $h_i$. Note that throughout this document, the transmission of either symbols or bits holds regarding application of the present invention. The invention applies to the general case of M-ary signaling, the binary case being when M=2. We will continue with the binary case as an illustrative example in the following description. It is appreciated that the description below can be applied to the general case of M-ary signaling.

For simplicity and clarity sake, it is assumed that the receiver input is sampled at a rate of one sample per symbol. All the equations presented infra can be modified by one skilled in the art to reflect the case of fractional spaced equalization wherein the receiver input is sampled at a rate of more than one sample per symbol. The output of the channel $x_n$ can be expressed as $$x_n = w_n + \sum_{i=0}^{m} B_{n-i} \cdot h_i \qquad (1)$$

where $x_n$ represents the received samples $B_n$ represents the bits transmitted (e.g., +1, −1);

$w_n$ represents the noise;

$h_i$ represents the impulse response of the channel;

m represents the length of the channel, i.e. the length of the impulse response

In accordance with the invention, the detection of the received bits is performed by first eliminating the influence of $h_i$ using the technique of iterative equalization described herein. This technique comprises two equalization steps: the first step performs iterative subtraction while the second step uses the inverse of the transfer matrix. Both methods are described in more detail hereinbelow.

First Iteration

The method assumes that the impulse response $h_i$ is either known or estimated by some external means, e.g., correlation with a known preamble with good autocorrelation properties, and that the estimates of the previous symbols (bits) $\tilde{B}_{n-1} \ldots \tilde{B}_{n-m}$ were previously determined, wherein m is the length of the impulse response. Then the following expression can be used to calculate the impulse response of the current symbol (bit)

$$y_j = x_j - \sum_{i=j-n+1}^{m} B_{j-i} \cdot h_i, \quad j = n \ldots n+m-1 \qquad (2)$$

where $y_j$ represents the modified received samples with the influence of all previous symbols removed;

$x_j$ represents the received symbol (or bit);

$B_{j-i}$ represents the bits transmitted;

$h_i$ represents the impulse response of the channel;

m represents the length of the channel, i.e. the length of the impulse response

Note that the entity $y_j$ represents the impulse response of the symbol n (including additive noise) only whereby the impulse response of the previous symbols has been subtracted out. This operation 'cleans' the intersymbol interference from previous symbols but not from future symbols, so still a large amount of ISI is left. Note that, for purposes of calculating Equation 2, the soft decisions (as are computed below) are used for the previous symbols while zero is used for the case j−i<0.

Once the modified received symbol $y_j$ is calculated, the estimate of the current symbol (bit) $\tilde{B}_n$ can then be calculated using the following expression $$\tilde{B}_n = f\left(\sum_{i=0}^{m} y_{i+n} \cdot h_i^*\right) \qquad (3)$$

where $f(\ )$ is a soft decision function (e.g., hyperbolic tangent). The slope of the decision function preferably increases with the iterations. Thus, the modified received symbol $y_n$ is processed through a matched filter operation (i.e. a correlation function) which functions to estimate the symbol. Note that in the case of QPSK the soft decision is applied separately on the real and imaginary components. In the case of QAM or other modulation, the soft decision needs to be modified accordingly.

It is important to note that bad estimates of the previous symbols (bits), and the ISI due to future symbols may influence the estimation of the current bit. In order to overcome this problem, the present invention performs one or more iterations. In addition, the matrix inversion method as described below is used to increase the performance of the equalizer. After the second iteration, the majority of the influence from neighboring symbols has already been subtracted out, thus enabling more accurate estimations to be calculated. Third and subsequent iterations are performed to achieve even more accurate results. During the additional iterations, the future symbols (i.e. symbols indexed n+1 . . . n+m) are estimated and subtracted as is shown infra.

The iteration process can be performed a fixed number of times or can be repeated until the Bit Error Rate (BER) or some other metric converges to a constant (i.e. a minimum error is achieved in the estimate). Note that since the influence of the neighboring symbols was already subtracted from the receive signal, only the error of the neighboring symbols need be calculated and compensated in subsequent iterations (after the first iteration).

Improvement by Transfer Matrix Calculation

In accordance with the iterative equalization method of the present invention, the output of the matched filter, can be expressed using the following expression $$z_n = \sum_{i=0}^{m} x_{i+n} \cdot h_i^* \quad (4)$$

where $z_n$ represents the output of the matched filter;

$x_{j+n}$ represents the input to the equalizer;

$h_i$ represents the impulse response of the channel;

m represents the length of the channel, i.e. the length of the impulse response

Note that the format of Equation 4 is similar to that of Equation 3. Equation 4 implements a matched filter. The relationship between the transmitted bits $B_n$ and the output of the matched filter $z_n$ neglecting the noise can be expressed as shown in Equation 5.

Note also that for the complex case, where both h and x(n) are complex, the upper triangle in the matrix should be conjugated. It is appreciated that one skilled in the art would know how to modify the expression below for the complex case.

$$\begin{bmatrix} z_n \\ z_{n-1} \\ \vdots \\ \vdots \\ z_0 \end{bmatrix} = \begin{bmatrix} h_{00} & h_{10} & h_{20} & \cdots & 0 \\ h_{10} & h_{00} & h_{10} & \cdots & 0 \\ h_{20} & h_{10} & h_{00} & \cdots & \vdots \\ \vdots & \vdots & \vdots & \vdots & h_{10} \\ 0 & 0 & \cdots & h_{10} & h_{00} \end{bmatrix} \cdot \begin{bmatrix} B_n \\ B_{n-1} \\ \vdots \\ \vdots \\ B_0 \end{bmatrix} \quad (5)$$

where $z_n$ represents the output of the matched filter;

matrix h is the channel estimate;

$B_n$ represents the symbols (bits) transmitted; and $$h_{00} = \sum_{i=0}^{m} h_i \cdot h_i \quad (6)$$

$$h_{10} = \sum_{i=1}^{m} h_i \cdot h_{i-1}$$

$$h_{kO} = \sum_{i=k}^{m} h_i \cdot h_{i-k}$$

In conventional linear equalization, the approach to determine $B_n$ is to calculate matrix h and then compute its inverse. This approach, however, is very difficult to implement in an ASIC and is not practical. This is because the calculation of the inverse of the matrix is very difficult when implementing this algorithm in hardware or software.

Thus, in accordance with the present invention, a relatively small number of neighbors are calculated using the inverse matrix equalizer. All the other neighbors are cancelled out using the iterative subtraction equalization technique of the present invention. Note that any number of neighbors may be calculated depending on the processing resources available. Through experimentation, it has been found that calculating just one or two neighbors yields good performance. Note that any linear equalization could be used including, but not limited to, zero forcing, Least Mean Squares (LMS), matrix inversion using the MMSE criterion and matrix inversion using the LSE criterion.

In the next iteration, Equation 2 is modified to yield $$y_j = x_j - \sum_{i=j-n+1}^{m} \tilde{B}_{j-i} \cdot h_i - \sum_{i=0}^{j-n-S} \tilde{B}_{j-i} \cdot h_i, \quad (7)$$

$$j = n \ldots n + m - 1$$

where the third term in the equation represents the contribution of future symbols to $x_j$ j and S represents the number of neighbors to be processed using linear equalization. These S symbols make up a sliding window.

The output of the matched filter as applied to the $y_j$, output of (7), neglecting the noise, can be expressed using the following expression $$z_n = \sum_{i=0}^{m} y_{i+n} \cdot h_i^*$$

Assuming the subtracted symbols are correct, we obtain $$\begin{bmatrix} z_{n+S-1} \\ z_{n+S-2} \\ \vdots \\ \vdots \\ z_n \end{bmatrix} = \begin{bmatrix} h_{00} & h_{10} & h_{20} & \cdots & h_{S-1,0} \\ h_{10} & h_{00} & h_{10} & \cdots & h_{S-2,0} \\ h_{20} & h_{10} & h_{00} & \cdots & \vdots \\ \vdots & \vdots & \vdots & \vdots & h_{10} \\ h_{S-1,0} & h_{S-2,0} & \cdots & h_{10} & h_{00} \end{bmatrix} \cdot \begin{bmatrix} B_{n+S-1} \\ B_{n+S-2} \\ \vdots \\ \vdots \\ B_n \end{bmatrix}$$

without losing generality, let us assume S=2.

$$\begin{bmatrix} z_{n+1} \\ z_n \end{bmatrix} = \begin{bmatrix} h_{00} & h_{10} \\ h_{10} & h_{00} \end{bmatrix} \cdot \begin{bmatrix} B_{n+1} \\ B_n \end{bmatrix}$$

An LSE estimation of $B_n$, $B_{n+1}$ can be obtained by $$\begin{bmatrix} \tilde{B}_{n+1} \\ \tilde{B}_n \end{bmatrix} = f\left( \begin{bmatrix} h_{00} & h_{10} \\ h_{10} & h_{00} \end{bmatrix}^{-1} \begin{bmatrix} z_{n+1} \\ z_n \end{bmatrix} \right) \quad (8)$$

where the soft decision function is also applied to each element. If the window of S symbols is now slid one symbol to the right, only the last symbol from the estimated vector $\tilde{B}_n$ is needed for the feedback, so only this symbol needs to be actually calculated. In alternative embodiments of the invention, the window is slid by a number of symbols each time, and a number of symbols are calculated during the linear equalization step.

Figure 2:
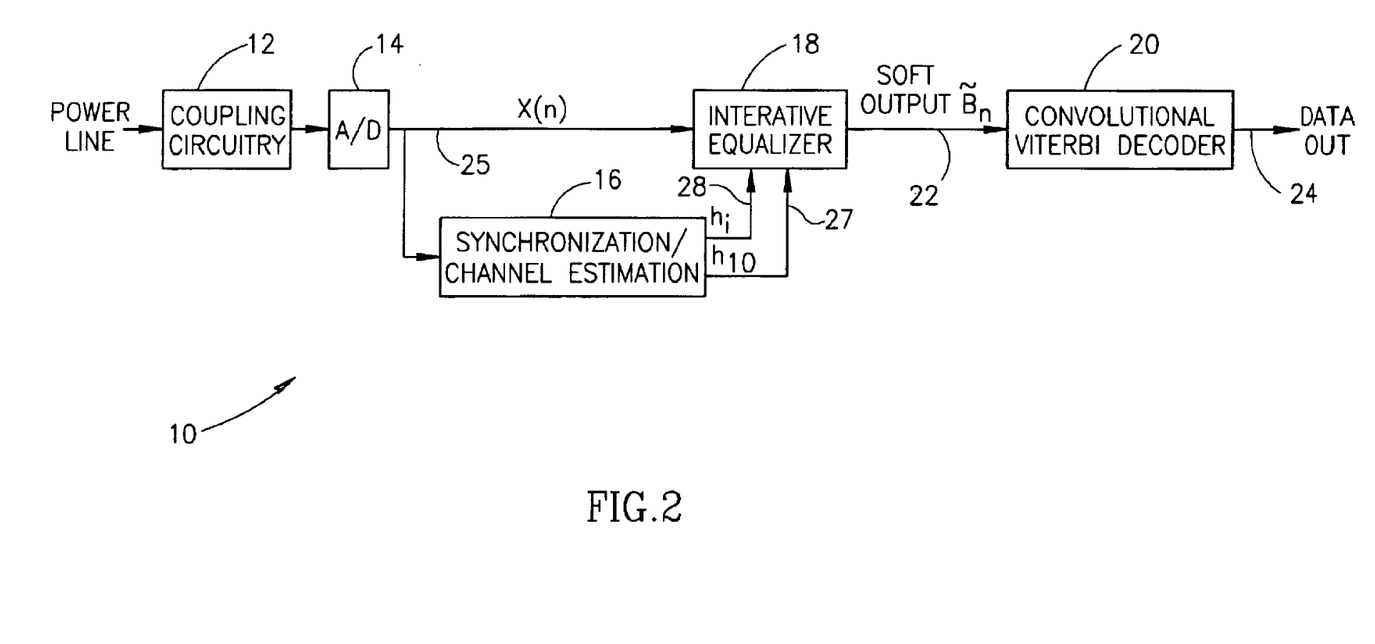
FIG. 2 is a block diagram illustrating the structure of an example concatenated receiver including an iterative equalizer constructed in accordance with the present invention.

A block diagram illustrating the structure of an example concatenated receiver including an iterative equalizer constructed in accordance with the present invention is shown in FIG. 2. The equalization technique of the present invention is described in the context of a communications receiver. Note the communication receiver shown herein is presented for illustration purposes only and is not meant to limit the scope of the present invention. It is appreciated that one skilled in the communication arts can construct numerous other types of receivers incorporating the iterative equalization technique of the present invention.

The receiver, generally referenced 10, comprises coupling circuitry 12 connected to the channel media, for example the power line, an A/D converter 14, synchronization/channel estimation 16, iterative equalizer 18, matrix calculation module 26, outer decoder 20, de-interleaver 19.

The signal from the channel is input to the channel coupling circuit 12 which functions as the analog front end for the receiver. The channel coupling circuit comprises an anti-aliasing filter (not shown). The signal output of the channel coupling circuitry 12 is input to the A/D converter 14. The digitized receive data stream is input to both the iterative equalizer 18 and the synchronization/channel estimation 16. Additional filtering, conditioning, decimation or down-conversion of the signal can optionally be applied before the equalizer. This module functions to detect the training sequence or sync sequence sent by the transmitter. This module also functions to generate an estimate of the channel.

The channel estimation 16 is operative to generate a channel estimate 28 represented by $h_i$ that is used by both the matrix calculator 26 and the iterative equalizer 18. The channel estimation is generated using the received input samples x(n) 25.

Numerous methods of channel estimation are known in the art and suitable for use with the present invention, for example, those based on correlation techniques and those based on least squares techniques.

The output of the iterative equalizer 18 comprises soft symbol decisions $\tilde{B}_n$ 22. The iterative equalizer is operative to output soft decision information given (1) received signal from the channel x(n) 25, (2) channel estimate information $h_i$ 28 (e.g., FIR filter taps used to estimate the channel) and (3) channel estimate matrix element $h_{10}$ 27 The soft decision information $\tilde{B}_n$ output of the iterative equalizer 18 is input to the outer decoder 20 which is preferably an optimal soft decoder. The outer decoder functions to locate and fix errors using the redundancy bits inserted by the encoder. The outer decoder generates the binary receive data. Examples of the outer decoder 20 include convolutional decoders utilizing the Viterbi Algorithm, convolutional Forward Error Correction (FEC) decoders, turbo decoders, etc. Soft input Viterbi decoders have the advantage of efficiently processing soft decision information and providing optimum performance in the sense of minimum sequence error probability.

Note that optionally, an interleaver/de-interleaver may be added to the system. In this case, a symbol based interleaver/de-interleaver is used. If a bit based interleaver/de-interleaver is used, some mechanism of mapping soft symbols to bits must be used before the outer decoder.

In operation, the transmitter transmits a modulated signal to the channel. In the example embodiment described herein, the transmitter transmits a binary phase shift keying (BPSK) or quadrature phase shift keying (QPSK) modulated signal to the channel. The iterative equalization technique requires knowledge of the impulse response of the channel $h_i$. This can be obtained using the channel estimation techniques described above. One method of determining $h_i$ is to transmit a training sequence or sync pattern comprising a pseudo noise (PN) sequence. The signals are transmitted grouped together in the form of packets wherein each packet begins with the PN synchronization sequence.

At the receiver, the received signals are sampled by the A/D converter and input to the synchronization module 16. A correlator is used to detect the beginning of a packet. The output of the correlator also comprises the impulse response $h_i$ of the channel. The correlation is performed between the received input samples and the expected synchronization sequence which must be known a priori.

Note that in one embodiment, the channel estimation assumes a fixed length channel denoted by m. If the channel is actually longer, then the resulting estimate will lose some information. If the channel is actually shorter, then some processing would be performed unnecessarily. Optionally, the channel length may be estimated before the channel estimate is performed using signal processing techniques well known in the art.

In accordance with the invention, the iterative equalizer subtracts the influence of all the previous symbols from the current received symbol using $h_i$ and the soft decisions $\tilde{B}_{n-1} \ldots \tilde{B}_{n-m}$ of the previous received bits as expressed in Equation 2 above. Subtracting the influence of the previous symbols provides an estimate of the transmitted symbol $\tilde{B}_n$. The accuracy of the soft decisions used in the first iteration is improved by performing additional iterations.

In the second iteration, the previously calculated soft decisions are updated so as to generate more precise soft decisions which are subtracted from the current received symbol. At this point in time, estimates for future symbols (i.e. symbols indexed by n . . . n+m) have been calculated and are subtracted. Note that in the general case, the iterations continue until the error difference between the transmitted bits and the received bits converges to a constant BER (or less then a predetermined threshold). In the example embodiment presented herein, the iterative equalizer performs four iterations. The four iterations are fixed and are performed regardless of the error difference. Alternatively, the number of iterations can be made variable, depending on any suitable error criteria.

This method of equalization has the advantage of eliminating the need to perform complex calculations to determine the inverse response of the channel. This is due to the use of the matched filter in determining the soft decisions.

Figure 3:
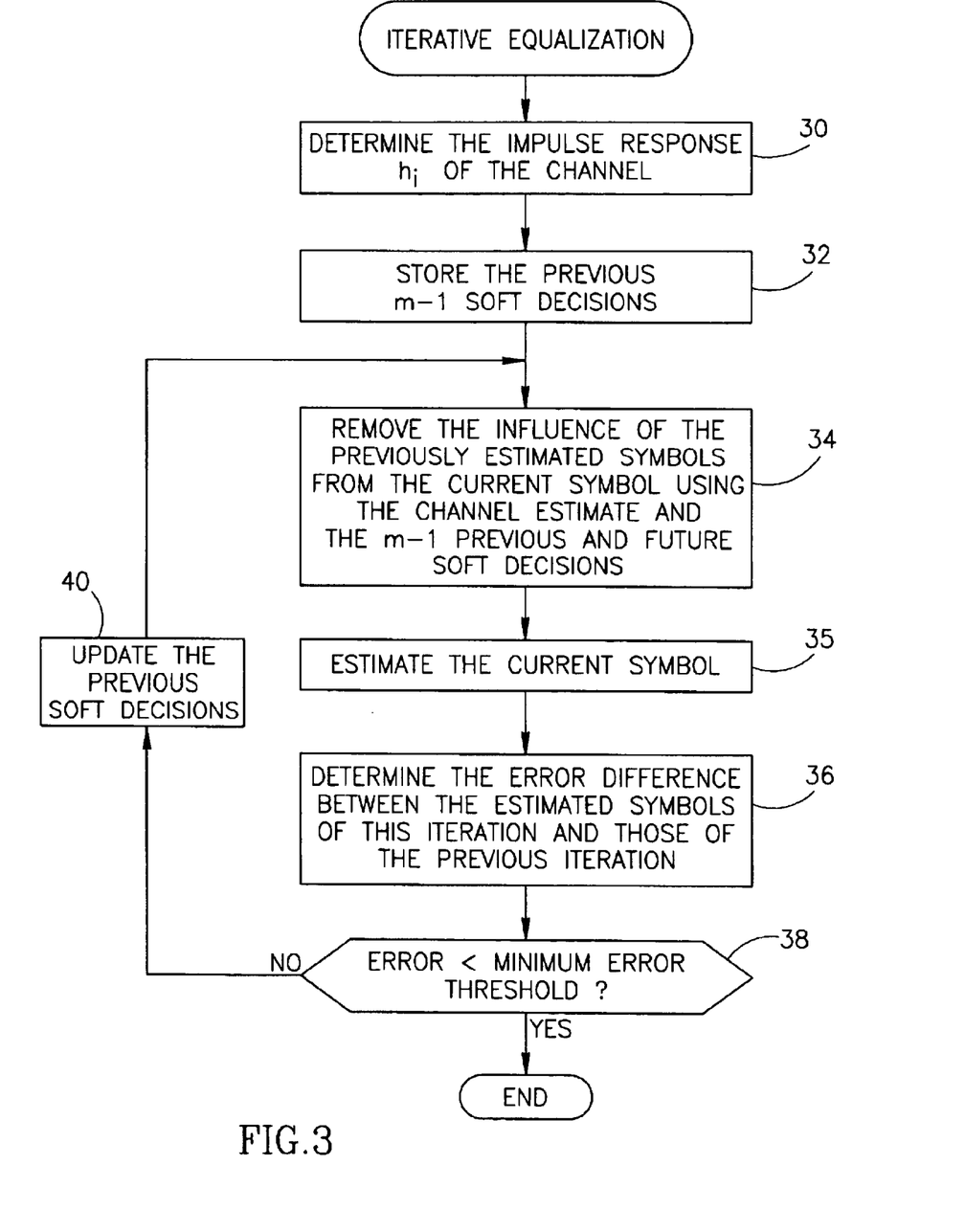
FIG. 3 is a flow diagram illustrating the iterative equalization method of the present invention.

A flow diagram illustrating the iterative equalization method of the present invention is shown in FIG. 3. As described previously, the iterative equalization method of the present invention requires knowledge of the impulse response $h_i$ of the channel (step 30). The channel impulse response is determined using the correlator which functions to correlate the transmitted synchronization sequence with the expected sequence. In addition, the method uses the previous m−1 soft decisions which are stored for this purpose (step 32).

The influence of all the symbols already estimated apart from a window of S−1 neighbors, is subtracted from the current symbol using the channel estimate and the m−1 previous and m−1 future soft decisions (step 34). The soft decision is calculated using Equations 7 and 8 in step 35. The error difference is then calculated between the symbols estimated during this iteration and those of the previous iteration (step 36). The error difference is compared to a predetermined threshold (step 38), and if greater, another iteration is performed. The soft decisions for the symbols are updated (step 40) and the method repeats steps 34, 36 and 38. The method terminates when the error difference is less than the predetermined threshold. Note that alternatively, the number of iterations may be fixed as in the example implementation presented hereinbelow.

Figure 4:
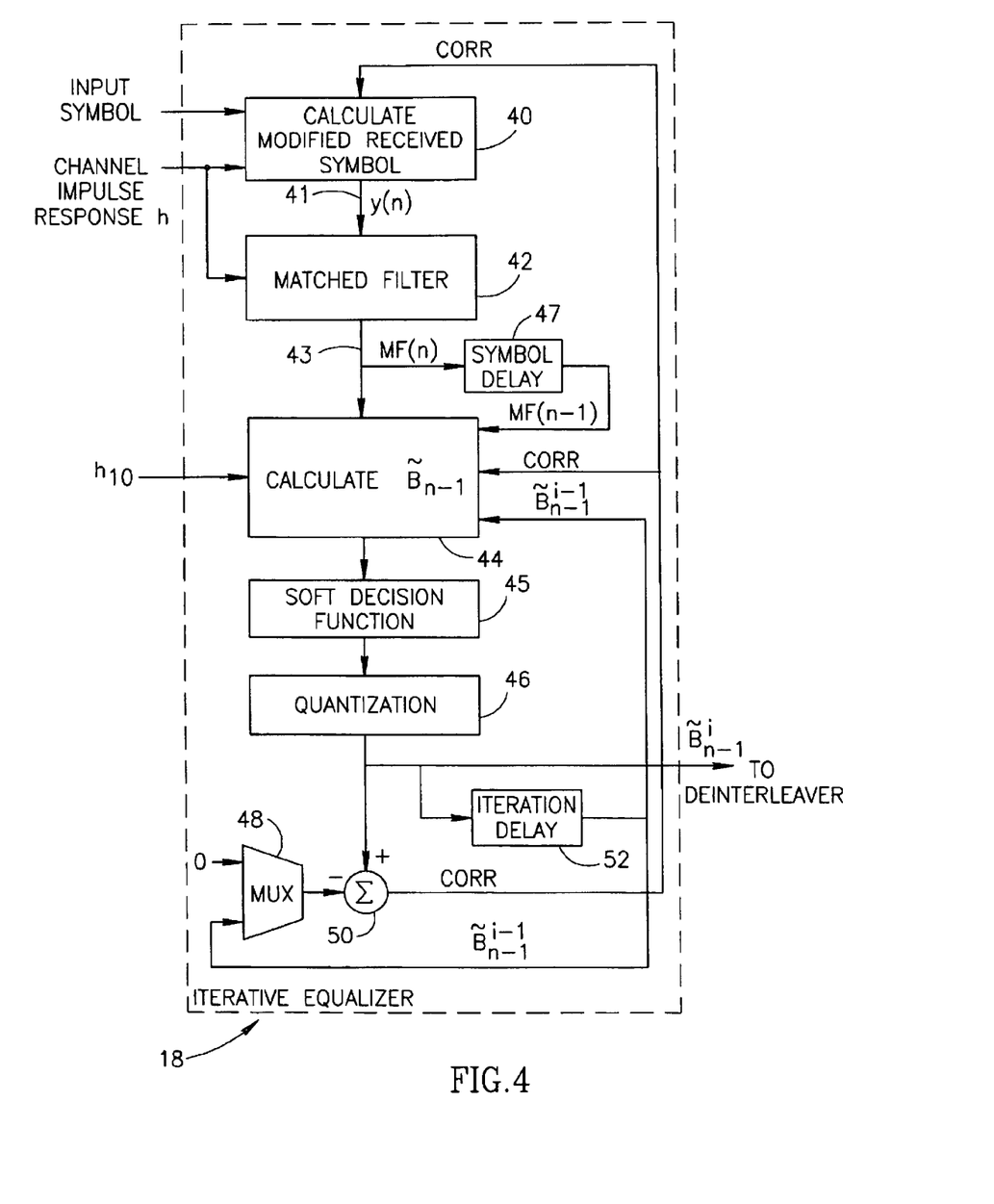
FIG. 4 is a block diagram illustrating the iterative equalizer of the present invention in more detail.

A block diagram illustrating the iterative equalizer of the present invention in more detail is shown in FIG. 4. Note that the implementation described hereinbelow has been optimized for compact implementation in VLSI and thus does not explicitly implement the general formulas presented hereinabove. Mathematically, however, the implementation given below is equivalent to the equations presented above.

In accordance with the invention, the channel coefficients $h_i$ are calculated at the beginning of each packet. In addition, they can be updated during the packet if needed. The iterative equalizer uses the coefficients calculated for the duration of the packet. The channel parameters are calculated using the cross correlation coefficient $h_{10}$ 27 (FIG. 2).

The function of the equalizer is to remove the channel interference from the received signal. Under the second assumption that the time response of the channel for a symbol stream is equal to the channel response for each individual symbol, the received symbol is reconstructed by subtracting the time response (i.e. impulse response) of all the other symbols from the current symbol.

The iterative equalizer, generally referenced 18, comprises a modified received symbol calculator 40, matched filter 42, soft decision calculator 44, quantizer 46, multiplexer 48, summer 50 and delay 52. The equalizer is operative to generate soft symbol decisions $\tilde{B}_n$ using as input the received symbol $x_n$ samples, channel impulse response $h_i$ from the channel estimator and $h_{10}$ computed therefrom.

First, the modified received symbol is calculated using block 40. The modified received symbol calculator 40 functions to subtract the impulse response of previous estimated symbols leaving the impulse response of the current symbol y(n) 41 cleaner (see Equation 2). In the second and higher iterations, only a correction on the previous estimate needs to be subtracted. The modified received symbol is then correlated by $h_i$ using block 42 (i.e. matched filter operation). The output 43 of the matched filter, denoted by MF(n), along with MF(n-1) and CORR (n-2) from the previous symbol (not the previous iteration) and also $\tilde{B}_{n-1}^{i-1}$ from the previous iteration (i-1), is then used to calculate the transmitted symbol $\tilde{B}_{n-1}^{i}$ (where the superscript denotes iteration 'i'). The value MF(n-1) is generated by passing MF(n) through a symbol delay line 47 which delays the matched filter output by one symbol time (i.e. four clock cycles). Blocks 40 and 42 will now be described in more detail.

Figure 5:
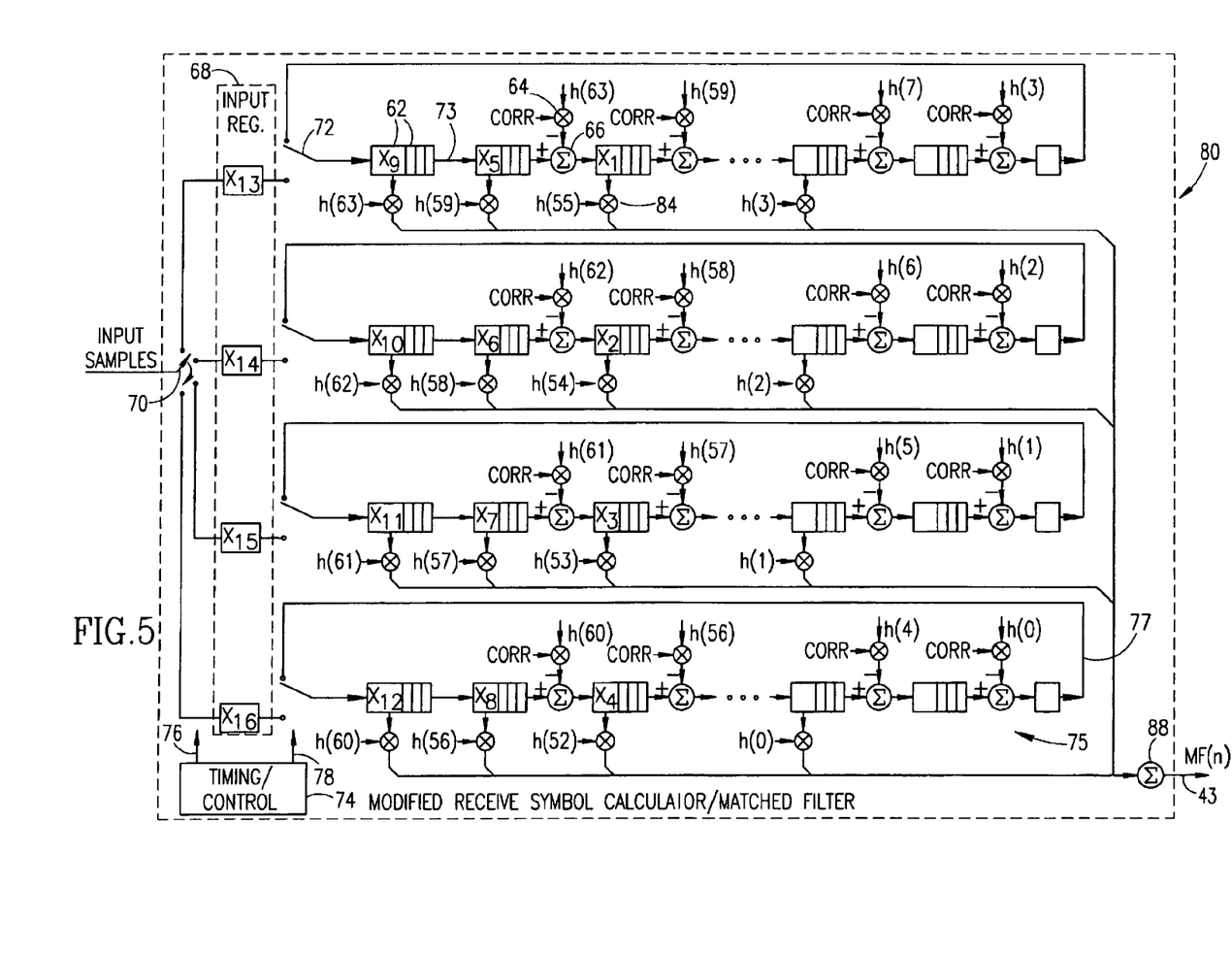
FIG. 5 is a block diagram illustrating the modified received bit calculator/matched filter of FIG. 4 in more detail.

A block diagram illustrating the modified received symbol calculator/matched filter of FIG. 4 is shown in FIG. 5. The modified received symbol calculator/matched filter, generally referenced 80, is operative to implement the modified received symbol calculator 40 and the matched filter 42 blocks of FIG. 4. The apparatus 80 comprises a shift register array of four rows of sample shift registers 75, each row comprising 69 sample registers 62 containing 8 bits of resolution each. A timing and control block 74 controls the timing of the sample shift register filling process. The arriving input samples 70 are written into input registers 68, one input register associated with each sample shift register.

Note that the length of the equalizer is in this example is equal to 64 samples. The ratio between the sample rate and the symbol rate (or bit rate) in this example is four samples per symbol while the number of iterations is also fixed at four. The equalizer structure disclosed herein can be modified by one skilled in the art to accommodate different numbers of iterations and different number of samples per symbol, both of them not necessarily being equal to each other.

The samples arrive to the sample shift register and are written therein as follows. The input sample vector (i.e. register 68) is filled after the arrival of every four samples comprising a symbol. In this example embodiment, each sample comprises 8 bits of resolution. At each sample time, switch 70 rotates so as to steer the input sample to the appropriate next register. After the input sample vector is filled with four samples, it is parallel loaded into the sample shift register via the plurality of switches 72. At each of the intermediary samples, each of the four shift registers are shifted to the right. The shift registers are shifted in a cyclic manner due to the position of the quad ganged switch 72. During the three samples, the switch 72 is set to cycle the rightmost sample back to the input via loop back connections 77.

The equalizer is operative to output a soft decision of the current symbol every symbol time (every four sample clocks). The equalizer is operative to keep each sample within the sample shift register for four cycles through its respective shift register row before it is overwritten with a new sample. Each shift register row is of length 69 samples and a new sample enters the row every four sample clocks. Thus, on the fifth cycle through the row, a sample is overwritten with a new one. In general, the length of the row must be one more than a multiple of the number of samples per symbol.

For illustration purposes, the first 16 input samples, labeled $X_1$ through $X_{16}$, are shown in their respective sample locations in the sample shift register array. Every four sample clocks, the contents of the input sample register are loaded into the sample shift register array. The first symbol, for example, comprises sample locations labeled $X_1$, $X_2$, $X_3$ and $X_4$. The sample shift register array thus holds 64 samples for each iteration at any one time.

As the contents of each row is cyclically shifted right, the channel estimate $h_i$ is multiplied, via multipliers 64, with a CORR value representing the new symbol decision minus the decision for the same symbol calculated during the previous iteration. The result of the multiplication is subtracted from the input sample via adders 66. The channel estimate comprises 64 coefficients. This represents a channel length m of 16 symbols with each sample comprising four samples. It is appreciated that the equalizer of the present invention is not limited to a channel length of 16 and can be modified by one skilled in the art to accommodate other channel lengths as well.

Each row comprises 16 multipliers and 16 adders. The top row uses coefficients $h_{63}$, $h_{59}$ ... $h_3$; while the next row uses coefficients $h_{62}$, $h_{58}$ ... h2; the following row coefficients $h_{61}$, $h_{57}$ ... $h_1$; and the bottom row coefficients $h_{60}$, $h_{56}$ ... $h_0$. Thus, at each sample time, the influence of the previously processed symbols is subtracted out. Sixteen subtractions are performed for each row. Each sample, however, is shifted through its row four times resulting in four symbol subtractions per input symbol. Each such subtraction is timed such that it is carried out on the sample belonging to the next iteration. Likewise, the CORR calculation is timed such that it is available at the proper time in the proper iteration. In this fashion, the sample shift register array implements the iterative subtraction described supra.

It is important to point out that the position in each row indicated by reference numeral 73 does not have a multiplier/adder associated with it. Once the correction impulse response of the previously processed symbol has been iteratively subtracted, the resulting modified received symbol 41 is effectively passed through a matched filter via multipliers 84. A total of 64 taps of the sample shift register array contents are connected to multipliers 84 which are operative to generate the product of the channel response and the modified received symbol. A tap is connected to every fourth register in each row. Sixteen multipliers are associated with each shift register row, wherein coefficients $h_{63}$, $h_{59}$ ... $h_3$ are associated with the first row; coefficients $h_{62}$, $h_{58}$ ... $h_2$ are associated with the second row; coefficients $h_{61}$, $h_{58}$ ... $h_1$ are associated with the third row; and coefficients $h_{60}$, $h_{56}$ ... $h_0$ are associated with the fourth (bottom) row. The apparatus 80 thus effectively implements Equation 4 on the current contents of the modified received signal.

The outputs of the multipliers may be stored in product registers (not shown). Summer 88 is adapted to add all 64 product results so as to yield a matched filter soft output 43 for the current symbol, denoted MF(n).

Note that since it is convenient to denote the last computed matched filter output by the index n, instead of n+1, the index n will be shifted by 1 in the following with respect to previous section. With reference to FIG. 4, the output 43 of the matched filter is input to the soft symbol calculation block 44. The block utilizes the channel estimate coefficient $h_{10}$, the MF(n) from the matched filter and the previous MF(n−1) and the previous CORR value to calculate the transmitted symbol $\tilde{B}_{n-1}{}^i$. The calculations performed by the block 44 are expressed mathematically by the following $$h_{00} = \sum_{i=k}^{m} h_i^2 \quad (9)$$

$$h_{10} = \sum_{i=k}^{m} h_i \cdot h_{i-k}$$

where k is equal to number of samples per symbol, i.e. 4, and $$\begin{bmatrix} z_n \\ z_{n-1} \end{bmatrix} = \begin{bmatrix} h_{00} & h_{10} \\ h_{10} & h_{00} \end{bmatrix} \cdot \begin{bmatrix} B_n \\ B_{n-1} \end{bmatrix} \quad (10)$$

At this point it is important to realize that the contents of the sample shift register are influenced by the operations in the previous iterations (or steps). From Equation 10 we obtain $$\tilde{B}_n = \frac{1}{DET} \cdot [z_n \cdot h_{00} - z_{n-1} \cdot h_{10}]$$

$$\tilde{B}_{n-1} = \frac{1}{DET} \cdot [z_n \cdot (-h_{10}) + z_{n-1} \cdot h_{00}] \quad (11)$$

Where DET is the determinant of the 2×2 matrix in Equation 10. Note that by way of experimentation by the inventors, it was found that division by the determinant DET may optionally be omitted without sacrificing performance. In addition, it was found that normalization by dividing by $h_{00}$ is required to achieve adequate performance.

The values $z_n$ and $z_{n-1}$ are obtained from the matched filter output MF. It is important to note that the values $z_n$ and $z_{n-1}$ are calculated in order to compensate for the terms that were removed during previous operations. The effects of these terms are calculated and placed back into the expressions for $z_n$ and $z_{n-1}$. The calculation is as follows $$z_{n-1} = MF_{n-1} + h_{10} \cdot CORR_{n-2} + h_{00} \tilde{B}_{n-1 1}{}^{i-1} \quad (12)$$

This removes the effect of the last correction, where CORR (n−2) is the correction applied on the previous symbol and need to be compensated $$z_n = MF_n + \tilde{B}_n{}^{i-1} h_{00} + h_{10} \cdot \tilde{B}_{n-1}{}^{i-1} \quad (13)$$

This effectively removes the influence of the previously estimated $B_{n-1}$, $B_n$ which was removed from the sample shift register in the previous iteration and thus from the value MF. Note that the inventors not only detected no loss in performance, but actually a gain was noticed, when the term $\tilde{B}_n h_{00}$ was removed from Equation 13. The reason for this is that we want to estimate $\tilde{B}_{n-1}$ so we would like to use its influence on the received signal.

The value $\tilde{B}_{n-1}$ is needed, thus we compute $$\tilde{B}_{n-1} = \frac{1}{h_{00}} \cdot [z_n \cdot (-h_{10}) + z_{n-1} \cdot h_{00}] \quad (14)$$

The result $\tilde{B}_{n-1}$ is then (optionally) input to the soft decision function 45. Note that some optimization in the number of calculations can be obtained by substituting Equations 12 and 13 into Equation 14.

The output of the soft decision function is, for implementation proposes, quantized into one of a finite number of levels via quantizer 46. In the example embodiment presented herein, 5 levels are used {−1, −½, 0, ½, 1}. The quantized and soft limited version of the symbol $\tilde{B}_{n-1}$ is then subtracted from the corresponding symbol from the previous iteration via subtractor 50. Thus, the previous estimate of the same symbol is subtracted from the current estimate. Ideally, the value of CORR should decrease to a minimum. The difference is denoted by CORR and is used by block 40 in removing the influence of the correction in the value of $\tilde{B}_{n-1}$ and is also used by block 44 to calculate $\tilde{B}_{n-1}$. Note that for each symbol, four values of $\tilde{B}_{n-1}$ are calculated, each during a different iteration of the equalizer.

The output of the quantized $\tilde{B}_{n-1}$ forms the output of the equalizer and is input to the subsequent stage, i.e. the de-interleaver or decoder (if interleaving is not employed). Note that for each symbol, four values of $\tilde{B}_{n-1}{}^i$ are generated. Only the final value, i.e. the fourth value when i=4), calculated after the fourth iteration for the symbol, is output to the next processing stage. The first, second and third values are ignored.

In addition, the output of the quantization $\tilde{B}_{n-1}{}^i$ is delayed one complete iteration delay via iteration delay line to yield $\tilde{B}_{n-1}{}^{i-1}$ 52. The iteration delay 52 functions to compensate for the sample shift register delay encountered in the shift register rows within blocks 40 and 42 by imposing a delay of about 68 clocks. The output of the iteration delay is input to calculation block 44 and to one of the two inputs to multiplexer 48. The multiplexer functions to pass the $\tilde{B}_{n-1}{}^{i-1}$ value during the second, third and fourth sample clock cycles and zero during the first clock cycle since no previous estimated symbols are generated until the second iteration. The output of the multiplexer is subtracted from the quantized version of $\tilde{B}_{n-1}{}^i$ via subtractor 50 to yield the CORR value.

Each time a symbol traverses the sample shift register four times, a new correction factor CORR is calculated and a new soft symbol is generated. A symbol returns for updating and re-decision every 69 clocks, therefore the last $\tilde{B}_{n-1}{}^i$ used for the current symbol is used again after an iteration delay of 68 clock cycles to calculate the new $\tilde{B}_{n-1}{}^i$ value for the next cycle. After four iterations in the equalizer, the soft decision for $\tilde{B}_{n-1}{}^i$ is assumed to converge to a constant BER. Note that depending on the application this may not be a valid assumption. Therefore, the number of samples per symbol, number of clock cycles per symbol and number of iterations may be fixed at a value other than 4, and are not necessarily equal to each other.

In an alternative embodiment, the equalizer is constructed using concatenated shift registers rather than the cyclic shift register structure of FIG. 5. For this embodiment, however, additional hardware is required including duplicate multipliers and adders.

Note also that the output of the equalizer may (1) be input to the input of ECC decoder if one is used in the receiver, (2)

be input to a de-interleaver before the ECC if both are used or (3) comprise the output of the receiver directly if no interleaving or ECC is used. Further, the output of the equalizer may be taken before or after the soft decision function 45 (FIG. 4). Due to coarse quantization used in the equalizer example above in order to save complexity, the decoder can be modified to use a larger number of bits in the soft input.

Computer Embodiment of the Iterative Equalizer

Figure 6:
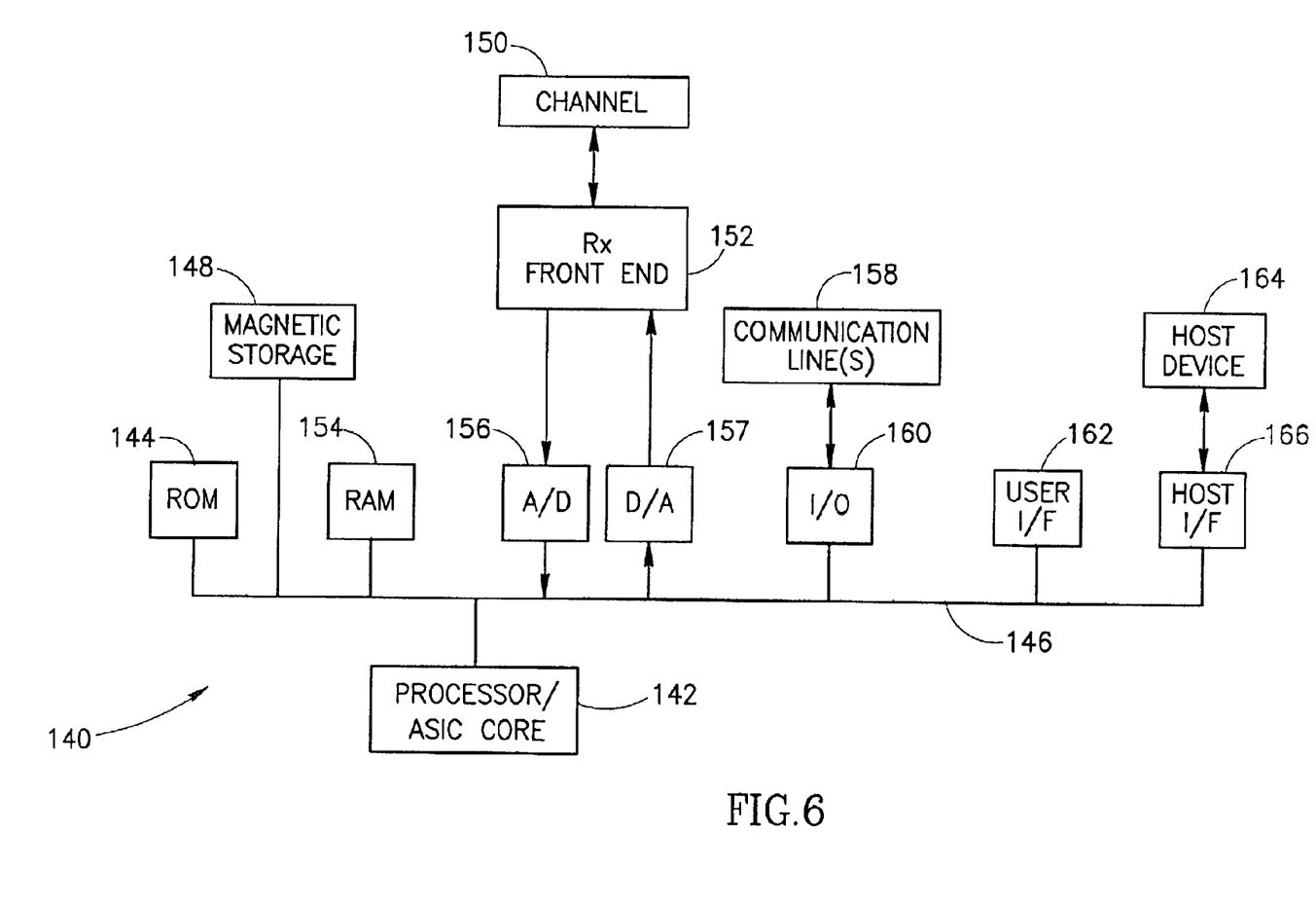
FIG. 6 is a block diagram illustrating an example computer system adapted to perform the iterative equalization method of the present invention.

In another embodiment, a computer is operative to execute software adapted to perform the iterative equalization method of the present invention. A block diagram illustrating an example computer system adapted to perform the iterative equalization method of the present invention is shown in FIG. 6. The system may be incorporated within a communications device such as a receiver or transceiver, part of which is implemented in software.

The computer system, generally referenced 140, comprises a processor 142 which may be implemented as a microcontroller, microprocessor, microcomputer, ASIC core, central processing unit (CPU) or digital signal processor (DSP). The system further comprises static read only memory (ROM) 144 and dynamic main memory, e.g., random access memory (RAM) 154, all in communication with the processor. The processor is also in communication, via bus 146, with a number of peripheral devices that are also included in the computer system. An A/D converter 156 functions to sample the received signal output of the Rx front end 152 coupled to the channel 150 (e.g., the power line, twisted pair, etc.). Samples generated by the processor are input to the front end circuit via D/A converter 157. The front end circuit comprises PHY circuitry, including receiver, transmitter and channel coupling circuitry.

One or more communication lines 158 are connected to the system via I/O interface 160. A user interface 162 responds to user inputs and provides feedback and other status information. A host interface 166 connects a host device 164 to the system. The host is adapted to configure, control and maintain the operation of the system. The system also comprises magnetic storage device 148 for storing application programs and data. The system comprises computer readable storage medium which may include any suitable memory means including but not limited to magnetic storage, optical storage, semiconductor volatile or non-volatile memory, biological memory devices, Jaz, Zip, DAT or any other memory storage device.

The iterative equalization software is adapted to reside on a computer readable medium, such as a magnetic disk (e.g., Zip, Jaz) within a disk drive unit or magnetic tape means (e.g., DAT). Alternatively, the computer readable medium may comprise a floppy disk, Flash memory card, EEROM, EPROM or EEPROM based memory, bubble memory storage, ROM storage, etc. The software adapted to perform the iterative equalization method of the present invention may also reside, in whole or in part, in the static or dynamic main memories or in firmware within the processor of the computer system (i.e. within microcontroller, microprocessor, microcomputer, DSP, etc. internal memory).

In alternative embodiments, the method of the present invention is applicable to implementations of the invention in integrated circuits, field programmable gate arrays (FPGAs), chip sets and especially application specific integrated circuits (ASICs), including wireless implementations and other communication system products.

Example C code that implements the iterative equalizer of the present invention is presented below in Program Listing 1. The program code may be stored in magnetic memory, disk drive, tape unit, firmware volatile or non-volatile memory for execution by the computer system described above.

---

Program Listing 1: Iterative Equalizer C Code

```
// The assumption here is h00=1 (i.e. the channel is normalized)
// h10 is precomputed
// T is array of soft decision slopes, different slope per iteration.
// L is the channel length in samples
// IT is number of iterations
// the code assumes one sample per symbol for simplicity, which may be complex.
int Decode(complex x) // x is one sample input to the equalizer
{
int a, it, i;
complex Delayed_B, MF, t, B_out;
complex correct, Z_out, Delayed_out;
complex soft, old;
Z[0][0]=x;
Delayed_B=0;
for (it=0; it<IT; it++) { // it runs on the iterations
    MF=0;
    for (i=0; i<L; i++) MF += Z[it][i]*conj(h[L-1-i]); // implement the matched filter
    // last_MF, last_correct are MF, correct of previous symbol respectively
    t=-h10*s+last_MF[it] + conj(h10)*last_correct[it] + Delayed_B*(1-h10*h10);
    // Delayed_B is B delayed by a full shift register length, so it is the u of the previous iteration
    B=f(t, T[it]); // pass through the soft decision function
    correct=Delayed_B-B;
    // feedback
    if (I<L) correct=0; // I is the bit number, and if I<L it means the shift register is not full, so correct is not valid
        // perform the update of the shift register contents.
    Z_out=Z[it][L] + h[0]*correct;
    for (i=L; i>1; i--) Z[it][i]=Z[it][i-1] + h[L-i+1]*correct;
    Z[it][1]=Z[it][0];
```

-continued

Program Listing 1: Iterative Equalizer C Code

```
// The assumption here is h00=1 (i.e. the channel is normalized)
// h10 is precomputed
// T is array of soft decision slopes, different slope per iteration.
// L is the channel length in samples
// IT is number of iterations
// the code assumes one sample per symbol for simplicity, which may be complex.
int Decode(complex x) // x is one sample input to the equalizer
{
int a, it, i;
complex Delayed_B, MF, t, B_out;
complex correct, Z_out, Delayed_out;
complex soft, old;
Z[0][0]=x;
Delayed_B=0;
for (it=0; it<IT; it++) { // it runs on the iterations
   MF=0;
   for (i=0; i<L; i++) MF += Z[it][i]*conj(h[L-1-i]); // implement the matched filter
   // last_MF, last_correct are MF, correct of previous symbol respectively
   t=-h10*s+last_MF[it] + conj(h10)*last_correct[it] + Delayed_B*(1-h10*h10);
// Delayed_B is B delayed by a full shift register length, so it is the u of the previous
iteration
   B=f(t, T[it]); // pass through the soft decision function
   correct=Delayed_B-B;
   // feedback
   if (I<L) correct=0; // I is the bit number, and if I<L it means the shift register is not
   if (it > 0) Z[it][0]=last_Iteration_out; // output of last iteration delay line
   last_Iteration_out=Z_out;
   // delay of B
   Delayed_B=DLYU[it].inout(B); // DLYU is an array of IT delay units delayed by
L+1 each.
   last_s[it]=s;
   last_correct[it]=correct;
   }
   return B;
   }
```

Further, it is appreciated that one skilled in the computer and electrical arts can implement the code in Program Listing 1 as a combination of hardware elements in a hardware implementation without departing from the scope of the invention. In this case, the each iteration is implemented using a separate shift register. Note that the number of multipliers in a hardware implementation of the software program listing is increased since their operating speed is now lower. Using multipliers as fast as in the iterative hardware embodiment described above (i.e. single shift register case) permits four multiplies using a single multiplier. In this case, however, the same number of multipliers are needed and thus the same number of MIPS is needed for both implementations.

Further, the invention may be implemented in the alternative in a software embodiment wherein the data samples are stored in a block buffer and the processing performed on a block by block basis rather than on a continuous basis as in the iterative hardware implemented described above. In addition, the processing need not be performed sequentially symbol by symbol but may be performed in any order desired.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of equalization of symbols transmitted over a channel having a channel impulse response $h_i$, said method comprising the steps of:
   calculating the impulse response of previously estimated symbols utilizing said channel impulse response $h_i$ and previously estimated decisions;
   selecting a window having a size of one or more symbols and removing an influence of previously estimated symbols from the received signal to generate a modified received signal;
   correlating said modified received signal with said channel impulse response to obtain a correlation for each symbol in the window;
   estimating the results of the correlation to yield a new estimate of said one or more of symbols; and
   repeating said steps of calculating, selecting, removing, correlating and estimating.

2. The method according to claim 1, wherein said step of removing the influence of previously estimated symbols comprises subtracting the impulse response of previously estimated symbols from the current receive sequence.

3. The method according to claim 1, wherein said step of estimating to yield a new estimate of the symbols after the influence of said previously estimated symbols is removed comprises using linear equalization operating on one or more neighboring symbols.

4. The method according to claim 3, wherein the linear equalization is based on an inverse channel estimation coefficient matrix.

5. The method according to claim 1, wherein said symbols transmitted over the channel comprise 2-PSK symbols (Binary PSK (BPSK)).

6. The method according to claim 1, wherein said symbols transmitted over the channel comprise 4-PSK symbols (Quadrature PSK (QPSK)).

7. The method according to claim 1, wherein said symbols transmitted over the channel comprise Quadrature Amplitude Modulation (QAM) symbols.

8. The method according to claim 1, wherein said steps of calculating, selecting, removing, correlating and estimating are repeated until an error difference between the symbol decision generated during the current iteration and the symbol decision generated during the previous iteration is less than a predetermined value.

9. The method according to claim 1, wherein said steps of calculating, selecting, removing, correlating and estimating are repeated a fixed number of times.

10. The method according to claim 1, wherein the step of estimating comprises applying non-linear estimation to said correlation results.

11. The method according to claim 10, wherein the step of applying non-linear estimation to said correlation results comprises multiplication of said correlation results by a matrix followed with processing by a decision function.

12. The method according to claim 11, wherein said matrix is obtained from inversion of a channel autocorrelation matrix.

13. The method according to claim 11, wherein said decision function comprises a hard decision function.

14. The method according to claim 11, wherein said decision function comprises a soft decision function.

15. The method according to claim 11, wherein said decision function comprises a soft decision function adapted to utilize a hyperbolic tangent function.

16. The method according to claim 11, wherein said decision function comprises a soft decision function whose decision slope changes over time.

17. The method according to claim 11, wherein said decision function comprises a soft decision function whose decision slope increases over time.

18. The method according to claim 1, wherein said window size is 1.

19. The method according to claim 11, wherein said window size in 1 and said matrix is reduced to scalar normalization only.

20. The method according to claim 1, wherein said window size is 2.

21. The method according to claim 1, wherein said window size is 2 and said step of estimation is performed using a matrix.

22. The method according to claim 1, wherein said steps of calculating, selecting, removing, correlating, and estimating are performed in a non-sequential symbol order.

23. The method according to claim 1, wherein said steps of calculating, selecting, removing, correlating and estimating are performed on a block of samples comprising said symbols.

24. The method according to claim 1, wherein said steps of calculating, selecting, removing, correlating and estimating are performed in a non-sequential symbol order on a block of samples comprising said symbols.

25. A method of equalization of symbols transmitted over a channel said method comprising the steps of:

providing a sample shift register array comprising a plurality of rows;

calculating a cross correlation coefficient matrix and an inverse matrix determinant based on a channel estimate;

generating the impulse response of a first number of previous symbols;

subtracting the impulse response of said first number of previous symbols from the contents of said register array;

cyclically shifting the contents of said register array through a second number of cycles constituting an iteration and repeating said steps of generating and subtracting to generate a modified received symbol wherein the influence of said first number of previously processed symbols is removed;

performing a matched filter operation on the contents of said shift register array;

generating an estimate of a symbol in accordance with the output of said matched filter; and removing the influence of previously estimated symbols using said previously estimated symbols and said cross correlation coefficient matrix so as to yield soft symbol output.

26. The method according to claim 25, further comprising the step of quantizing said soft symbol output into a value representing a reliability thereof.

27. The method according to claim 25, further comprising the step of quantizing said soft symbol output into a value representing a reliability thereof, said value selected from the group comprising $\{-1, -½, 0, ½, 1\}$.

28. The method according to claim 25, wherein a length of said channel equals 16 symbols.

29. The method according to claim 25, wherein said symbols transmitted over the channel comprise 2-PSK symbols (Binary PSK (BPSK)).

30. The method according to claim 25, wherein said symbols transmitted over the channel comprise 4-PSK symbols (Quadrature PSK (QPSK)).

31. The method according to claim 25, wherein said symbols transmitted over the channel comprise Quadrature Amplitude Modulation (QAM) symbols.

32. The method according to claim 25, wherein the length of each row of said shift register array is proportional to the number of iterations of cyclical shifting performed.

33. The method according to claim 25, wherein said steps of calculating, generating, subtracting, cyclically shifting, performing a matched filter operation and removing are performed in a non-sequential symbol order on a block of samples comprising said transmitted symbols.

34. An iterative equalizer for equalizing, over a plurality of iterations, symbols transmitted over a channel having a channel impulse response $h_i$, comprising:

first means for iteratively removing an influence of previous estimated symbols from a received symbol so as to generate a modified current received symbol and for correlating said modified current received symbol with said channel impulse response to yield a matched filter output, a new modified received symbol and matched filter output generated every iteration of said equalizer;

second means for calculating a current symbol decision utilizing a previous symbol decision, the output of said matched filter and a cross correlation coefficient matrix; and a quantizer adapted to quantize said current symbol decision to a quantized symbol decision having a finite number of possible values; and third means for calculating a correction value comprising the difference between said current symbol decision calculated during the current iteration and said previous symbol decision calculated during the previous iteration.

35. The equalizer according to claim 34, wherein said first means comprises:
a plurality of sample shift registers, each sample shift register corresponding to one bit of an input sample, the input of each sample shift register comprising the output of a multiplexer, each multiplexer adapted to output either the output of a sample shift register fed back to said multiplexer or an input sample;
a plurality of multipliers adapted to generate a plurality of products, each multiplier adapted to calculate a portion of said influence of previous estimated symbols comprising the product of said channel response and said correction value;
a plurality of adders located in line with said sample shift registers and adapted to subtract said plurality of products from the current iteration of said modified received symbol so as to remove the influence of said previously estimated symbols; and
a summer adapted to sum said plurality of products to yield said matched filter output.

36. The equalizer according to claim 34, wherein said quantized symbol decision represents the reliability of said symbol decision.

37. The equalizer according to claim 34, wherein said quantizer is adapted to quantize said symbol decision into a value representing the reliability of said symbol decision, said value selected from the group comprising $\{-1, -\frac{1}{2}, 0, \frac{1}{2}, 1\}$.

38. The equalizer according to claim 34, wherein said first means comprises means for calculating the influence of the $n-1^{th}$ previous symbol in accordance with said previously estimated symbols and an inverse channel estimation coefficient matrix.

39. The equalizer according to claim 34, wherein a length of said channel is 16 symbols.

40. The equalizer according to claim 34, wherein said symbols transmitted over the channel comprise 2-PSK symbols (Binary PSK (BPSK)).

41. The equalizer according to claim 34, wherein said symbols transmitted over the channel comprise 4-PSK symbols (Quadrature PSK (QPSK)).

42. The equalizer according to claim 34, wherein said symbols transmitted over the channel comprise Quadrature Amplitude Modulation (QAM) symbols.

43. The equalizer according to claim 34, wherein said first means comprises linear equalization means operating on one or more neighboring symbols.

44. The equalizer according to claim 43, wherein said linear equalization means utilizes an inverse channel estimation coefficient matrix.

45. The equalizer according to claim 34, further comprising means for running said equalizer through said plurality of iterations until an error difference between the symbol decision generated during the current iteration and a symbol decision generated during the previous iteration is less than a predetermined value.

46. The equalizer according to claim 34, further comprising means for running said equalizer through a fixed number of iteration.

47. The equalizer according to claim 34, wherein said first means comprises means for applying non-linear estimation to said matched filter output.

48. The equalizer according to claim 47, wherein said means for applying comprises means for multiplying said matched filter output by a matrix and subsequently processing by a decision function.

49. The equalizer according to claim 48, wherein said matrix is obtained from inversion of a channel autocorrelation matrix.

50. The equalizer according to claim 48, wherein said decision function comprises a hard decision function.

51. The equalizer according to claim 48, wherein said decision function comprises a soft decision function.

52. The equalizer according to claim 48, wherein said decision function comprises a soft decision function adapted to utilize a hyperbolic tangent function.

53. The equalizer according to claim 48, wherein said decision function comprises a soft decision function whose decision slope changes over time.

54. The equalizer according to claim 48, wherein said decision function comprises a soft decision function whose decision slope increases over time.

55. A communications receiver for receiving and decoding an M-ary transmitted signal transmitted over a channel having a channel impulse response $h_i$, comprising:
a front end circuit for receiving and converting said M-ary transmitted signal to a baseband signal consisting of a plurality of received samples;
a demodulator adapted to receive said received samples and to generate input samples therefrom in accordance with the M-ary modulation scheme used to generate said transmitted signal;
an iterative equalizer operative to receive said input samples and to generate a sequence of symbol decisions therefrom, said iterative equalizer comprising processing means programmed to:
calculate the impulse response of previously estimated symbols utilizing said channel impulse response $h_i$ and previously estimated decisions;
select a window having a size of one or more symbols and remove the influence of previously estimated symbols from the received signal so as to generate a modified received signal;
correlate said modified received signal with said channel impulse response to obtain a correlation for each symbol in the window;
estimate the results of the correlation so as to yield a new estimate of one or more of said transmitted symbols;
repeat said steps of calculating, selecting, removing, correlating and estimating;
a decoder adapted to receive said estimate and to generate binary received data therefrom; and
wherein M is a positive integer.

56. The receiver according to claim 55, wherein said M-ary signal comprises 2-PSK symbols (Binary PSK (BPSK)).

57. The receiver according to claim 55, wherein said M-ary signal comprises 4-PSK symbols (Quadrature PSK (QPSK)).

58. The receiver according to claim 55, wherein said signals transmitted over the channel comprise Quadrature Amplitude Modulation (QAM) symbols.

59. The receiver according to claim 55, further comprising a de-interleaver adapted to receive said estimates and whose output is subsequently input to said decoder for decoding into binary data therefrom.

60. The receiver according to claim 55, wherein said processing means is adapted to remove the influence of previously estimated symbols from the received signal by subtracting the impulse response of these symbols from the current receive sequence.

61. The receiver according to claim 55, wherein said processing means is adapted to estimate said correlation results using linear equalization operating on one or more neighboring symbols.

62. The receiver according to claim 55, wherein said processing means is adapted to calculate and remove the influence of the n–1$^{th}$ previous symbol in accordance with said previously estimated symbols and an inverse channel estimation coefficient matrix.

63. The receiver according to claim 55, wherein a length of said channel is 16 symbols.

64. The receiver according to claim 55, wherein said processing means is adapted to repeat the steps of calculating, selecting, removing, correlating and estimating until an error difference between the symbol decision generated during the current iteration and the symbol decision generated during the previous iteration is less than a predetermined value.

65. The receiver according to claim 55, wherein said processing means is adapted to repeat the steps of calculating, selecting, removing, correlating and estimating a fixed number of times.

66. An electronic data storage media storing a computer program adapted to program a computer to execute the iterative equalizer process of claim 55.

67. A computer readable storage medium having a computer program embodied thereon for causing a suitably programmed system to equalize symbols transmitted over a channel having a channel impulse response $h_i$ by performing the following steps when such program is executed on said system:

calculating the impulse response of previously estimated symbols utilizing said channel impulse response $h_i$ and previously estimated decisions;

selecting a window having a size of one or more symbols and removing an influence of previous symbols from the received signal so as to generate a modified received signal;

correlating said modified received signal with said channel impulse response to obtain a correlation for each symbol in the window;

estimating the results of the correlation so as to yield a new estimate of one or more of said transmitted symbols;

repeating said steps of calculating, selecting, removing, correlating and estimating; and wherein M is a positive integer.

68. The computer readable storage medium according to claim 67, wherein said step of removing the influence of previous symbols comprises subtracting the impulse response of previous or future symbols from the current receive sequence.

69. The computer readable storage medium according to claim 67, wherein said step of estimating to yield a new estimate of the symbols after the influence of said previous symbols is removed comprises using linear equalization operating on one or more neighboring symbols.

70. The computer readable storage medium according to claim 69, wherein the linear equalization is based on an inverse channel estimation coefficient matrix.

71. The computer readable storage medium according to claim 67, wherein said symbols transmitted over the channel comprise 2-PSK symbols (Binary PSK (BPSK)).

72. The computer readable storage medium according to claim 67, wherein said symbols transmitted over the channel comprise 4-PSK symbols (Quadrature PSK (QPSK)).

73. The computer readable storage medium according to claim 67, wherein said symbols transmitted over the channel comprise Quadrature Amplitude Modulation (QAM) symbols.

74. The computer readable storage medium according to claim 67, wherein said steps of calculating, selecting, removing, correlating and estimating are repeated until an error difference between the symbol decision generated during the current iteration and the symbol decision generated during the previous iteration is less than a predetermined value.

75. The computer readable storage medium according to claim 67, wherein said steps of calculating, selecting, removing, correlating and estimating are repeated for a fixed number of times.

76. The computer readable storage medium according to claim 67, wherein a length of said channel is 16 symbols.

77. The computer readable storage medium according to claim 67, wherein said steps of calculating, selecting, removing, correlating and estimating are performed in a non-sequential symbol order on a block of samples comprising said transmitted symbols.

* * * * *